(12) United States Patent
Jansen

(10) Patent No.: US 7,469,712 B2
(45) Date of Patent: Dec. 30, 2008

(54) RELIEF VALVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 510 days.

(21) Appl. No.: 11/245,829

(22) Filed: Oct. 7, 2005

(65) Prior Publication Data

US 2006/0130901 A1 Jun. 22, 2006

Related U.S. Application Data

(60) Provisional application No. 60/617,298, filed on Oct. 8, 2004.

(51) Int. Cl.
*F16K 17/30* (2006.01)

(52) U.S. Cl. .................. 137/516.27; 137/542; 137/550

(58) Field of Classification Search ............ 137/516.27, 137/516.29, 512.5, 513, 515.5, 505.42, 516.25, 137/542, 543.21, 550

See application file for complete search history.

(56) References Cited

U.S. PATENT DOCUMENTS

| | | | | |
|---|---|---|---|---|
| 3,055,391 A | * | 9/1962 | Shuk et al. ............. | 137/516.25 |
| 3,288,578 A | * | 11/1966 | Witt ............................ | 48/192 |
| 3,446,233 A | * | 5/1969 | Herold et al. .......... | 137/516.27 |
| 3,746,263 A | * | 7/1973 | Reeder et al. .......... | 137/516.27 |
| 4,104,004 A | * | 8/1978 | Graef .......................... | 417/313 |
| 4,129,144 A | * | 12/1978 | Andersson et al. .......... | 137/541 |
| 4,131,235 A | * | 12/1978 | Lieding .................. | 239/533.15 |
| 4,394,945 A | * | 7/1983 | Taylor, Jr. ............... | 137/516.27 |
| 4,417,861 A | * | 11/1983 | Tolbert ................... | 137/516.27 |
| 4,541,455 A | * | 9/1985 | Hauser ................... | 137/516.27 |
| 5,039,284 A | * | 8/1991 | Talaski ................... | 137/516.27 |
| 5,349,984 A | * | 9/1994 | Weinheimer et al. ... | 137/543.21 |
| 5,465,752 A | * | 11/1995 | Higgins ................... | 137/512.5 |
| 6,050,081 A | | 4/2000 | Jansen et al. | |
| 6,783,108 B2 | | 8/2004 | Jansen | |
| 6,931,831 B2 | | 8/2005 | Jansen | |
| 2005/0056000 A1 | | 3/2005 | Jansen et al. | |

* cited by examiner

*Primary Examiner*—John Rivell
(74) *Attorney, Agent, or Firm*—Quarles & Brady LLP

(57) ABSTRACT

A valve for the fuel system of a turbine engine works to relieve high pressure transients in the liquid fuel side of the turbine engine arising from the elevated ambient temperatures of operation of the turbine on gaseous fuel. The valve also prevents significant pressure losses during turbine start-up and sustained operation. The valve is bi-stable and has a liquid fuel driven poppet that toggles between one of two closed positions to interrupt flow through the valve when below a lower pressure limit and when above an upper pressure limit. The poppet moves to an intermediate position temporarily to permit pressure relief. A method of operating such a valve is also provided.

18 Claims, 4 Drawing Sheets

RELIEF VALVE

CROSS-REFERENCE TO RELATED APPLICATION

This application claims benefit to U.S. provisional application Ser. No. 60/617,298 filed Oct. 8, 2004.

STATEMENT OF FEDERALLY SPONSORED RESEARCH OR DEVELOPMENT

Not applicable.

BACKGROUND OF THE INVENTION

1. Technical Field

The present invention relates to turbine engines, and in particular, to valves for relieving high pressure transients in the liquid fuel side of the turbine.

2. Description of the Related Art

Turbine engines are commonly used in power generation and propulsion applications. Generally, turbine engines have a set of rotating turbine blades that compress air leading to one or more combustors into which fuel is injected and ignited. Fuel is delivered through metering orifices to burners in the combustors under pressure through one or more fuel lines. Combustion of the fuel turns one or more sets of turbine blades, used for energy extraction or propulsion, and which can be used to drive the compressor blades.

Modern industrial gas turbines used for power generation are commonly operable in either liquid fuel (such as diesel fuel) and gaseous fuel (such as natural gas) modes. Such gas turbines thus include both a liquid fuel system and a gaseous fuel system. Due to their respective burn characteristics, typically, liquid fuel is consumed for turbine start-up and gaseous fuel is consumed for sustained operation of the turbine.

The pressure in each of the liquid and gaseous fuel systems can fluctuate during operation of the turbine and high pressure transients can arise. This is particularly a problem in the liquid fuel system given that liquids are generally not compressible. Elevated pressures commonly arise in the liquid fuel system during certain stages of turbine operation.

First, since liquid fuel is typically consumed during turbine start-up, the pressure in the liquid fuel system will rise significantly after ignition. During the start-up stage, the elevated pressure in the liquid fuel system is necessary to sustain burning. Thus, normally pressure loss in this stage is unwanted. Second, when the turbine is to be shut down or transitioned to operate in gaseous mode, high pressure transients can occur in the liquid fuel system due to the back flow of fuel back into the system caused by the shutting down of various pumps and metering devices, such as fuel pumps, flow dividers, distributor valves and purge valves, in the liquid fuel system. Third, after the turbine is switched to burn gaseous fuel, the ambient temperature surrounding the turbine rises due to the heat given off by the sustained operation of the turbine. This increase in temperature can cause expansion of the liquid fuel and increase the pressure within the liquid fuel system. These thermal pressure transients must be relieved.

Check valves are typically installed in communication with the liquid fuel system to regulate flow to a drain line and thus relieve the pressure in the liquid fuel system. The check valves are disadvantageous because they are one-way valves that open and close at a particular crack pressure and then return closed after the pressure subsides. Thus, a check valve will remain open as long as the pressure is at or above the crack pressure. However, as mentioned above, depending upon the stage of operation, it may be necessary to maintain pressure at a value higher than the crack pressure of the check valve, for example, during start-up. A single check valve would thus be insufficient for this purpose. Additionally, common check valves are spring-loaded ball valves that may be unreliable in the harsh environment of large industrial turbines, particularly given the contaminants present in the liquid fuel and the propensity for coking. Thus, such check valves may stick in the open position or allow backwash into either of the fuel lines.

The main fuel control valve that controls fuel flow in the liquid fuel system may be used instead to relieve pressure. However, the fuel cut-off valve is usually operated by a pneumatic actuator and thus is impractical for relieving pressure transients because of its difficultly to control precisely and because it would likely introduce a substantial pressure drop. Like check valves, it is also subject to coking due to its relatively close position to the combustion area of the turbine. Moreover, the fuel cut-off valve would also introduce a potential failure point to the turbine where, if pressure is lost to the pneumatic actuator, the turbine could cease operating.

Accordingly, an improved relief valve is needed that will relieve pressure transients, but also maintain pressure in the liquid fuel system when needed during various stages of turbine operation.

SUMMARY OF THE INVENTION

The present invention is a bi-stable valve that is particularly suited for relieving pressure that can build up in the liquid side of the fuel system of a turbine engine during various stages of operation of the turbine. In particular, the valve works to relieve thermal high pressure transients while preventing significant pressure losses during turbine start-up and sustained operation.

Generally, the valve includes a moveable valve member that toggles between one of two closed positions to interrupt flow through the valve when below a lower pressure limit and when above an upper pressure limit. The valve member moves to an intermediate position temporarily to relieve pressure transients within the pressure limits.

More specifically, in one aspect the invention provides a bi-stable valve for use in the fuel system of a turbine engine to relieve pressure between lower and upper pressure limits. The valve has a valve member, such as a poppet, that toggles between two closed positions in which flow from an inlet to an outlet is interrupted. The poppet is biased in one of the closed positions at least until the lower pressure limit is reached at the inlet. It is moved into to the second closed position after the upper pressure limit is reached. The poppet moves to an intermediate (open) position between the two closed positions when the inlet pressure is between the limits to permit flow from the inlet to the outlet.

The valve can use the media that it controls to drive, at least in part, the poppet or other valve member. In one preferred application, the media is liquid fuel, and in that case, the valve can be said to be "fueldraulic" in that fuel is used to actuate the valve. In one preferred case, a biasing member, such as a spring, can bias the poppet in the first closed position corresponding to below the lower pressure limit, and the fuel can move the poppet against this bias to open the valve and to re-seat the poppet in the second closed position corresponding to above the upper pressure limit.

In one preferred form the valve includes a housing defining a passageway between the inlet and outlet. Two seals, such as o-rings, are disposed about the passageway at an axial distance from each other. The valve member is disposed between the seals to intersect the passageway. The valve member can toggle between two closed positions in which the valve member seats against one of the seals to close off flow to the outlet. A biasing member, such as a compression spring, biases the valve member in contact with one of the seals where it stays until a crack pressure is reached. The valve member is moved between its biased state, preferably under the force of the controlled media, to in between the seals so that flow can pass to the outlet. When a close pressure is reached at the valve inlet, the valve member is moved into the second closed position, again preferably under the force of the controlled media, to re-close flow to the outlet.

The valve member is preferably a poppet valve. It can have a disk-shape with a leading face that seats against one seal and a trailing face that seats against the other seal. The poppet can also be disposed within an opening defined by a narrowed neck of the housing. When the poppet is open, fuel or other media can flow from the inlet through the space between the poppet and the neck of the housing. The narrowed neck allows the neck opening size to be bore to a controlled dimension as needed to achieve the desired flow characteristics. To prevent the poppet from becoming cocked and possibly locking against the neck, the poppet can have a rounded periphery and an elongated stem that guides and limits non-axial movement of the valve member between the closed positions. The stem can extend axially into the passageway and engage an internal part of the housing.

Also, the spring pre-loads the poppet to the first closed position. The pre-load force determines the operating range of the valve, that is the upper and lower pressure limits that will cause seating, opening, and re-seating of the poppet. The pre-load force is dependent upon the spring rate and pre-compression of the spring. To allow for quick and easy adjustment of the pre-compression, one or more spacer rings (of the same or differing thicknesses) can be placed between an end of the spring and the abutting structure. For example, one or more spacers can be disposed between the non-poppet end of the spring and a spring retainer.

In another aspect the invention provides a method of operating a valve as described above. According to this method, when the inlet pressure is below a lower pressure limit, the poppet is biased to seat against a first seal and close of a passageway between an inlet and an outlet. When it is above an upper pressure limit, the media that is controlled by the valve (e.g., liquid fuel) is used to seat the poppet against a second seal and close of the passageway. When within the pressure limits, the controlled media moves the poppet to an intermediate position between the seals to allow the controlled media to pass from the inlet to the outlet.

These and other advantages of the invention will be apparent from the detailed description and drawings. What follows is a preferred embodiment of the present invention. To assess the full scope of the invention the claims should be looked to, as the preferred embodiment is not intended as the only embodiment within the scope of the invention.

DETAILED DESCRIPTION OF THE PREFERRED EMBODIMENT

The present invention provides a relief valve 10 (see FIG. 1) particularly suited for use with dual fuel turbines in which the turbine consumes either liquid or gaseous fuel at one or more stages of operation. Such turbines are typically large industrial turbines used for power generation, and they typically burn liquid fuel (such as diesel fuel) during start-up and switch to gaseous fuel (such as natural gas) during sustained operation. In this context, the relief valve 10 is used to relieve transient high pressure in the liquid fuel system of the turbine, which can occur at start-up, the transition to gaseous fuel and as the liquid fuel is heated by the elevated ambient temperature surrounding the combustion areas of the turbine during operation on gaseous fuel. The valve is normally closed at turbine ignition when liquid fuel is used and during the dynamic transfer from gaseous to liquid fuel usage, and can be opened when high pressure transients arise during gaseous fuel operation to drain fuel and alleviate the high pressure.

Figure 1:
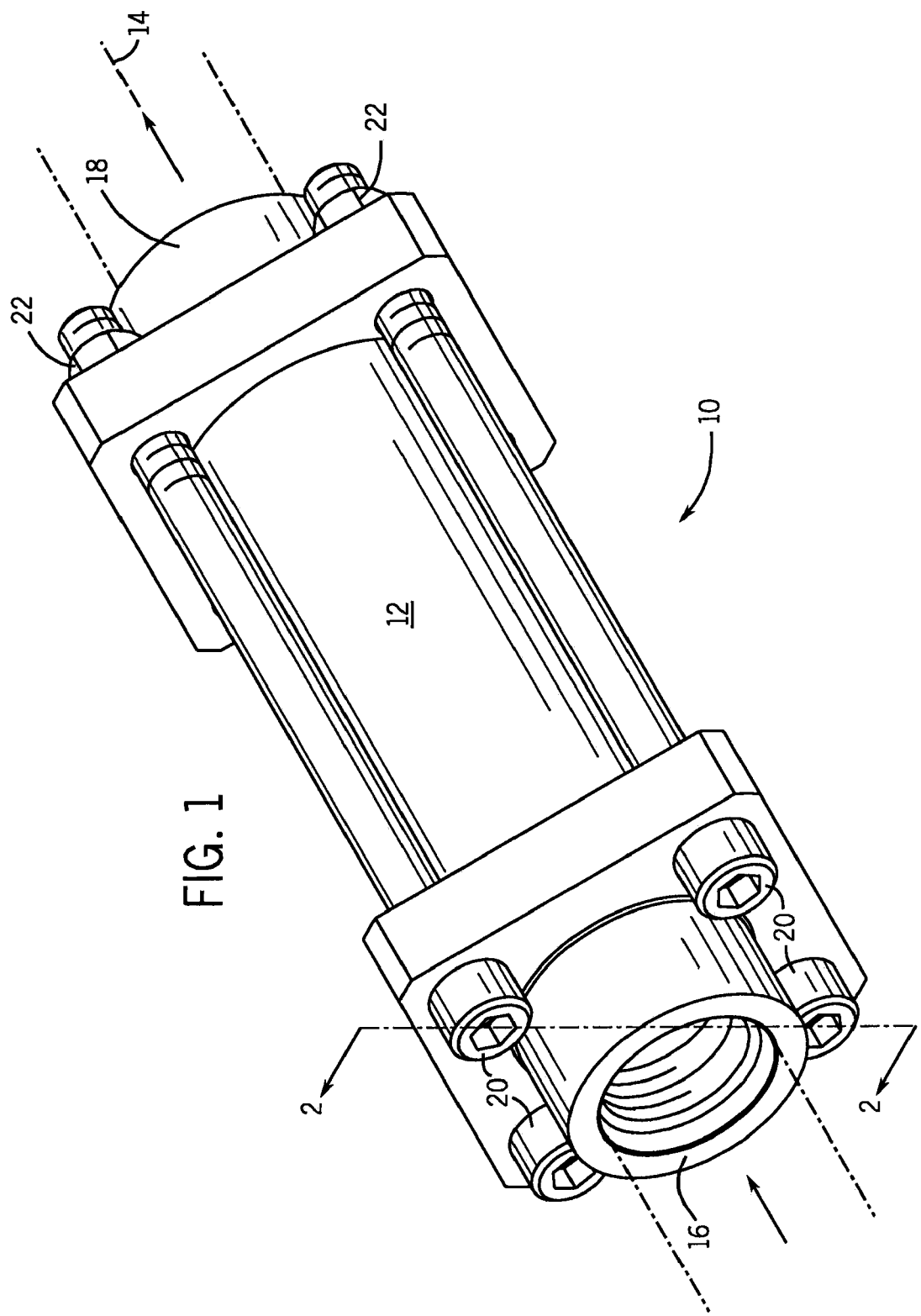
FIG. 1 is a perspective view of a thermal relief valve of the present invention.
Figure 2:
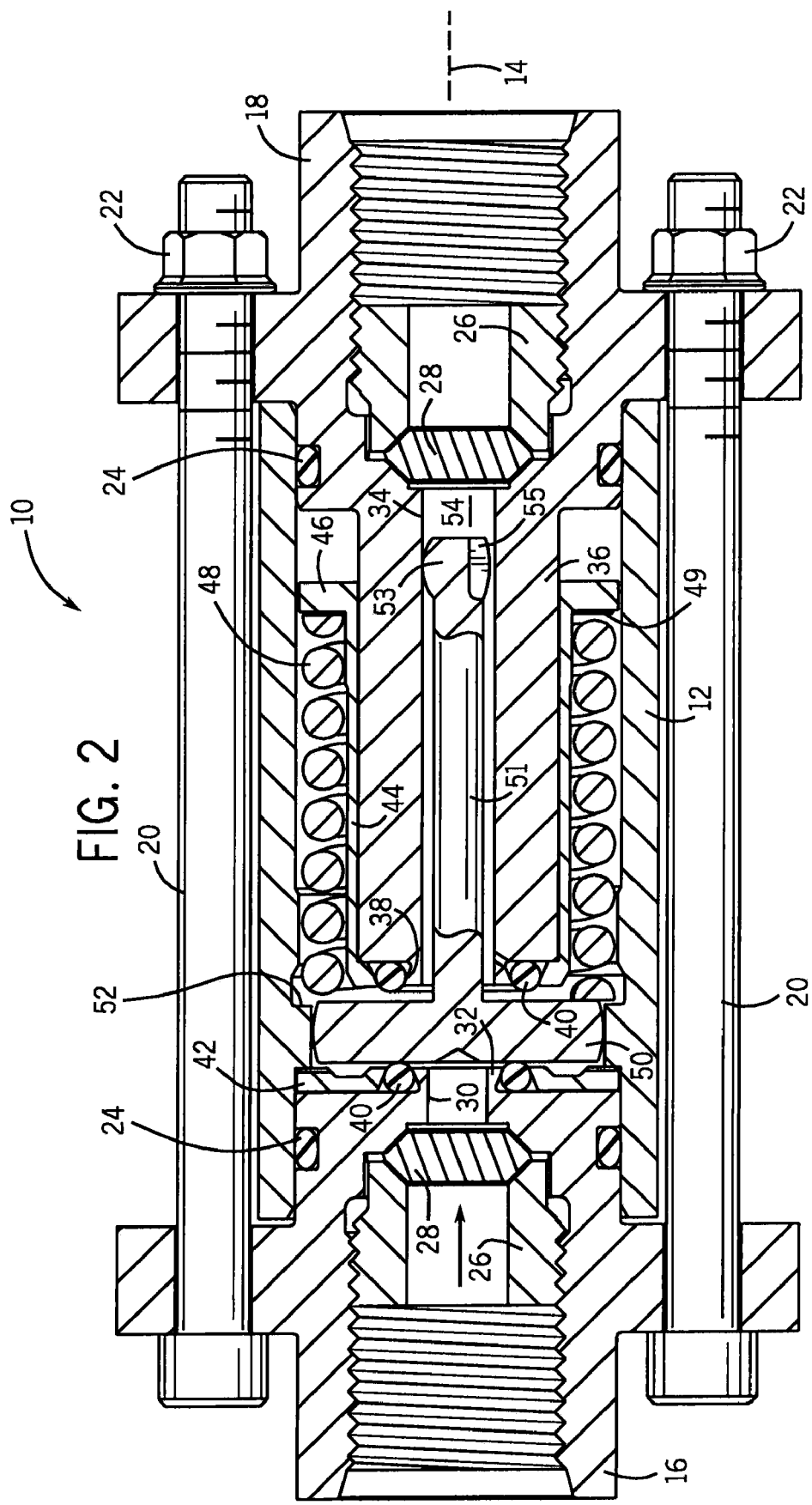
FIG. 2 is a sectional view thereof taken along line 2-2 of FIG. 1.

FIGS. 1 and 2 illustrate one preferred embodiment of the relief valve 10 of the present invention. As shown, the preferred relief valve 10 includes an elongated tubular housing 12 concentric about axis 14 with flanged end fittings 16 and 18. Four long bolts 20 and self-locking nuts 22 clamp the end fittings 16 and 18 to the housing 12. The end fittings 16 and 18 are sealed by o-rings 24 at an inside surface of the housing 12. The end fittings 16 and 18 define threaded recesses into which annular retainer nuts 26 are threaded to retain filters 28, which are preferably low pressure drop open weave type filters.

End fitting 16 has an opening 30, extending along the axis 14 through a short neck 32, and thus provides an inlet port. End fitting 18 also has an opening 34, which is defined by an elongated body 36 having a short neck 38, and thus provides an outlet port. Two o-rings 40 are disposed about each of the necks 32 and 38. The inlet o-ring is captured between chamfered surfaces of the neck 32 and a seat ring 42, and the outlet o-ring is captured by chamfered surface of the neck 38 and an annular spring retainer 44, which fits onto the body 36 of the outlet end fitting 18 and has a flange 46 that captures a compression spring 48. The spring retainer 44 compresses the spring 48 to effect a pre-load. One or more ring spacers 49 can be placed between the spring retainer flange 46 and the associated end of the spring 48 to allow for selectively adjusting the pre-compression to effect a desired pre-load.

The spring 48 presses against a poppet 50 that is moveably captured between the end fittings 16 and 18 and a narrowed neck 52 of the housing 12. The poppet 50 is disposed at the narrowed neck 52 to ease manufacturing by allowing the neck to be simply bored to a controlled dimension necessary to effect the desired flow characteristics. The poppet 50 is a generally flat round, disk-shaped piece with an elongated pilot stem 51 that extends into the opening 34 of the outlet end fitting 18. The pilot stem 51 extends generally axially and its enlarged trailing end 53 engages the inner diameter of the outlet end fitting 18 to limit non-axial movement of the poppet 50. Since the opening 34 is part of the drain passageway, the length of the pilot stem 51 is kept more narrow and the end 53 has axial passages 55 (one shown) so as not to disrupt flow. Also, the periphery of the poppet is slightly rounded over in the axial direction, thereby providing another anti-cocking feature, and also easing flow between the poppet 50 and the housing neck 52.

A passageway 54 is thus formed within the relief valve 10 between the opening 30 of the inlet end fitting 16, the gap between the end fittings 16 and 18 and the opening 34 of the outlet end fitting 18. The relief valve 10 can thus be coupled between the fuel side of the turbine and the drain to relieve excess pressure in the liquid fuel system by opening the poppet 50 so that fuel can pass into and through the passageway 54 to the drain.

The relief valve is a bi-stable valve in that it is designed to seat and hold seated the poppet 50 so as to close off the outlet to drain in two steady-state conditions, namely, when the pressure at the inlet side of the relief valve 10 is below a lower pressure limit (or crack pressure) and when the pressure at the inlet side of the relief valve 10 is above an upper pressure limit (close pressure). In one preferred form, this operational pressure range of the relief valve 10 has a lower pressure limit of 150 psig +/−10 psig and an upper pressure limit of 160 psig +/−10 psig, and the relief valve 10 is capable of operating with at least as little as only a 5 psig pressure differential between the limits.

Figure 3:
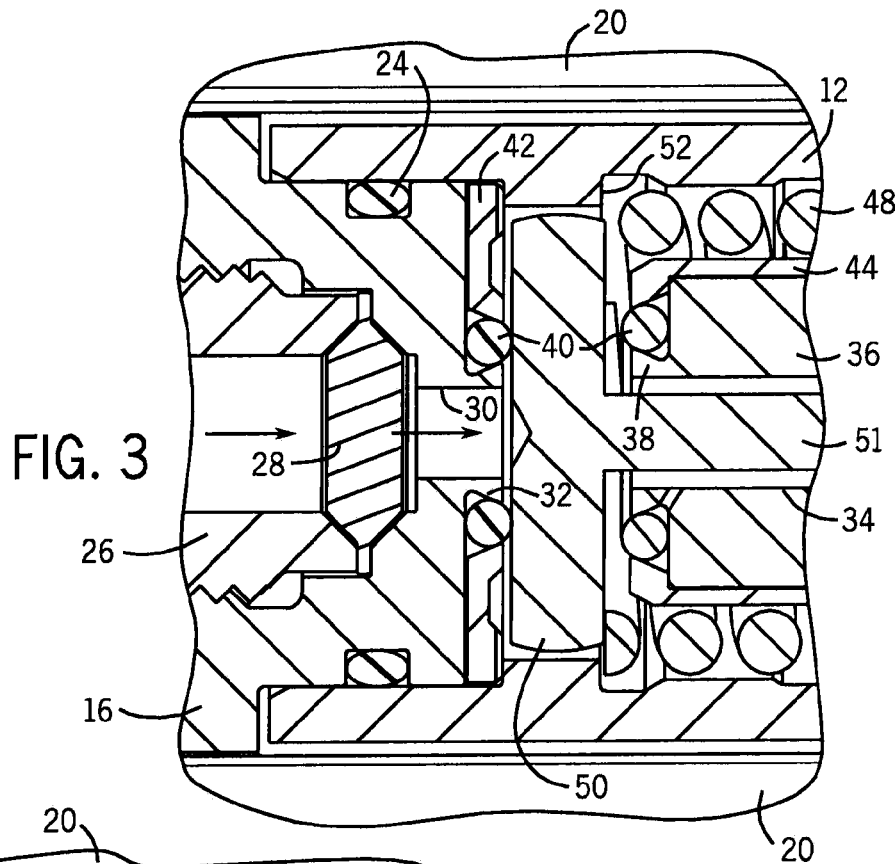
FIG. 3 is an enlarged partial sectional view showing the valve of FIG. 1 in a first closed state.
Figure 4:
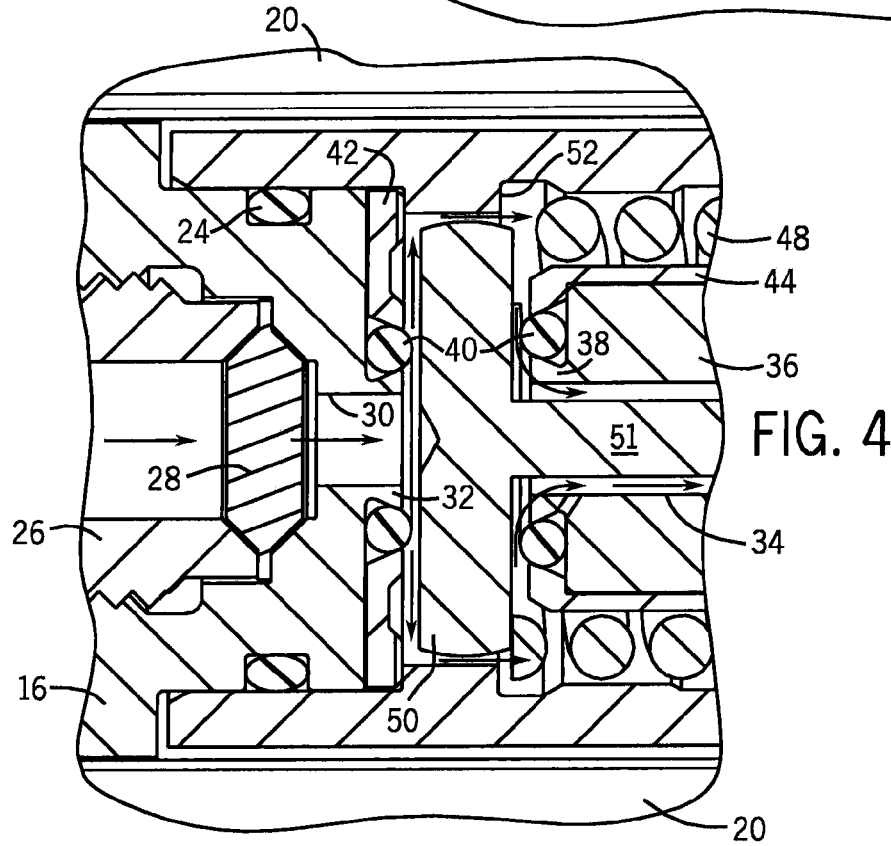
FIG. 4 is a view similar to FIG. 3 albeit showing the valve in an intermediate, open state.
Figure 5:
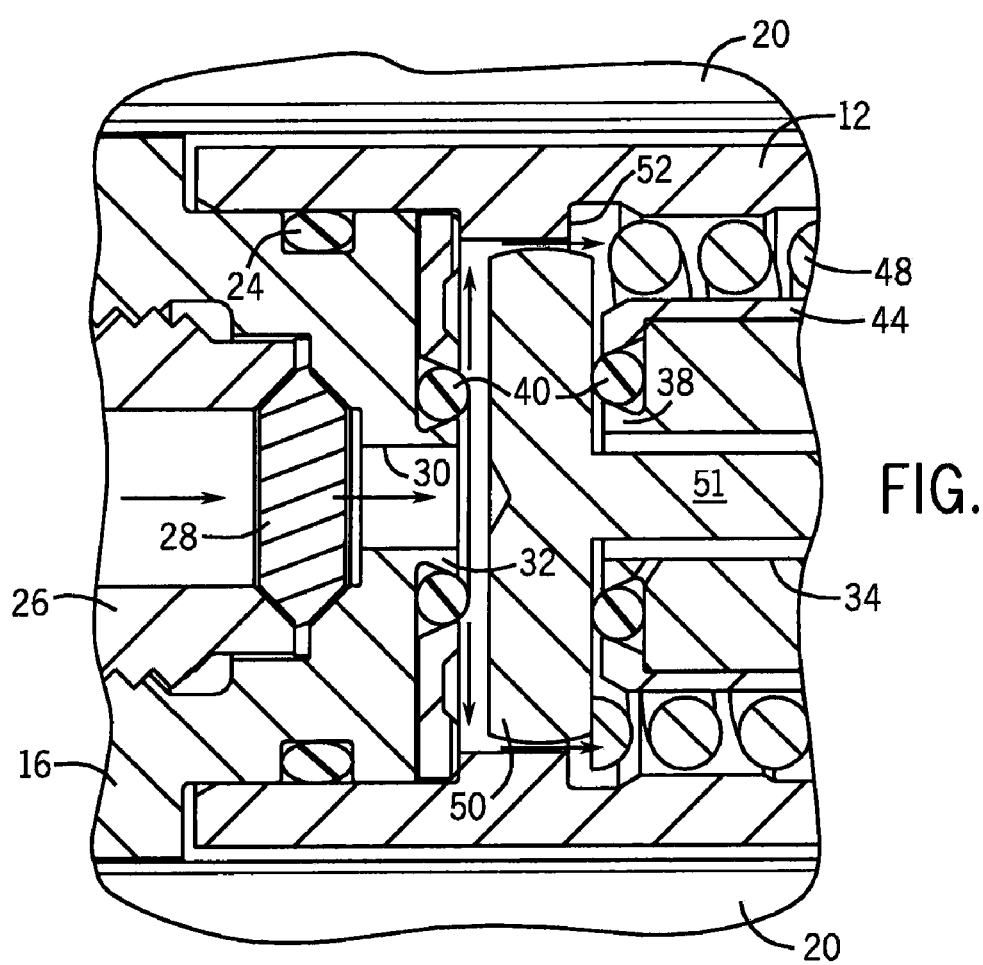
FIG. 5 is a view similar to FIG. 3 albeit showing the valve in a second closed state.

More specifically, as shown in FIGS. 3-5, the inlet side face of the poppet 50 abuts the o-ring 40 on the inlet end fitting 16 and creates a face seal therewith to close off flow through the passageway 54 to the outlet. This closed position shown in FIG. 3 is the normal, de-energized state of the relief valve 10, and it is held in this state by the spring 48. The spring 48 provides a pre-load force that ensures a tight seal throughout the low pressure operational range of the relief valve 10. Once the lower pressure limit (crack pressure) is reached, the hydraulic force of the liquid fuel acting on the inlet face of the poppet 50 will overcome the spring force of the spring 48 and move the poppet 50 axially toward the outlet end fitting 18. This has the effect of unseating the poppet 50 from the inlet o-ring 40 to open up flow through the passageway 54 to the outlet. As shown in FIG. 4, the fuel can flow through the opening 30 in the inlet end fitting 16, turn radially to flow along the inlet face of the poppet 50, turn again to flow around the periphery of the poppet 50, turn another time to flow along the outlet side of the poppet 50, and then turn one last time to axially through the opening 34 of the outlet end fitting 18 where it can pass out of the relief valve 10 to the drain. Since the poppet 50 is actuated by the hydraulic force liquid and the liquid is fuel, the relief valve 10 can be said to be a "fueldraulic" relief valve. The use of the fuel as the primary moving media eliminates the need for air, water, oil or other media lines, thereby reducing cost, size and complexity of the valve.

Once the upper pressure limit (close pressure) is reached, the poppet 50 will seat against the outlet side o-ring to once again close off flow to the outlet, as shown in FIG. 5. Once the pressure of the fuel flow subsides sufficiently, the force of the spring 48 will reseat the poppet 50 to seal against the o-ring 40 of the inlet end fitting 16, as shown in FIG. 3.

Thus, the relief valve 10 is designed to toggle between one of two closed positions to close off flow to the drain in one of two pressure conditions (below the lower pressure limit and above the upper pressure limit), while moving through intermediate positions between the two closed positions to open and allow for pressure relief when the pressure conditions are between the lower and upper limits. The operational characteristics of the relief valve 10 thus make it suitable for use with liquid fuel system of the turbine during all stages of operation of the turbine. In particular, the relief valve 10 will close off the liquid fuel system from the drain when the turbine is shut down. At start-up when liquid fuel is burned, the pressure will increase rapidly in the liquid fuel system and pressurize the relief valve 10 above the upper pressure limit, thereby causing the poppet to toggle to the second closed position of FIG. 5.

The relief valve 10 will thus avoid pressure loss in the liquid fuel system during liquid fuel consumption, although there will be very minor fuel flow to drain as the poppet 50 toggles from the position of FIG. 3 to the position of FIG. 5.

After start-up, the turbine is typically transitioned dynamically to burn gaseous fuel for sustained operation. The liquid fuel system is thus shut down so that pressure in the relief valve 10 will fall below the upper pressure limit, which thereby causes the poppet 50 to toggle to the first closed position of FIG. 3. During the transition to gaseous fuel, the actuating members (pistons, spools, etc.) of the liquid fuel pump, the purge valve and other such components of the turbine fuel system return to a null position to close down liquid fuel flow to the turbine. This can cause a back flow of fuel and thereby a pressure build-up in the liquid fuel system. Should this pressure rise above the lower pressure limit, the poppet 50 would move to an intermediate position between the o-rings 40 to open and stay open as long at the conditions were between the lower and upper pressure limits.

Once the turbine is operating in gaseous mode and the liquid fuel system is shut down, the relief valve 10 will be in the closed state of FIG. 3. The sustained operation of the turbine will raise the ambient temperature where the liquid fuel system is located. The elevated ambient temperatures can cause thermal expansion of the liquid fuel and thereby raise the pressure inside the liquid fuel system. As high pressure transients rise above the crack pressure, the poppet 50 will unseat from the inlet side o-ring to open the liquid fuel to the drain. Typically, the poppet 50 will open momentarily and reseat (on the inlet side o-ring) in a perking action to expel small, intermittent volumes of fuel to the drain. The relief valve 10 will thus continuously relieve thermal high pressure transients during sustained gaseous operation of the turbine.

Accordingly, the bi-stable valve of the present invention can be operated according to the following method or system. When the inlet pressure is below a lower pressure limit, the poppet is biased to seat against a first seal and close of a passageway between an inlet and an outlet. When it is above an upper pressure limit, the media that is controlled by the valve (e.g., liquid fuel) is used to seat the poppet against a second seal and close of the passageway. When within the pressure limits, the controlled media moves the poppet to an intermediate position between the seals to allow the controlled media to pass from the inlet to the outlet.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

I claim:

1. A valve for a turbine, the valve comprising:
 a housing defining a passageway between an inlet and an outlet;
 a first seal extending about the passageway;
 a second seal extending about the passageway at an axial distance from the first seal;
 a valve member disposed between the first and second seals and intersecting the passageway, the valve member being arranged to toggle between a first closed position in which the valve member is seated against the first seal and a second closed position in which the valve member is seated against the second seal, flow to the outlet being closed off when the valve member is in the first and second closed positions, wherein the valve member has an enlarged head with a contoured outer periphery disposed within an opening defined by a narrowed neck of the housing; and a biasing member biasing the valve member in contact with the first seal;

wherein the valve member is in the first closed position when pressure at the inlet is below a crack pressure and the valve member is in the second closed position when the inlet pressure is above a close pressure, and wherein when the valve member is between the first and second closed positions it is unseated from the first and second seals so that flow can pass to the outlet, wherein at least a portion of the outer periphery of the head of the valve member is disposed radially within the narrowed neck in both the first and second closed positions.

2. The valve of claim 1, wherein the valve member is a disk with a leading face that seats against the first seal when in the first closed position and a trailing face that seats against the second seal when in the second closed position.

3. The valve of claim 2, wherein the valve member has an elongated stem that guides movement of the valve member between the first and second closed positions.

4. The valve of claim 3, wherein an enlarged section of the stem spaced from the head contacts a body defining the passageway to limit non-axial movement of the valve member.

5. The valve of claim 4, wherein the enlarged section of the stem has an axial opening therethrough in communication with the passageway and the outlet.

6. The valve of claim 1, wherein the first and second seals are o-rings.

7. The valve of claim 6, wherein the o-rings are captured by retaining structures onto the inlet and the outlet.

8. The valve of claim 1, wherein the biasing member is a compression spring.

9. The valve of claim 8, further including a retainer mounted to an elongated body of the outlet for capturing the spring and maintaining its engagement with the valve member.

10. The valve of claim 9, further including at least one spacer ring disposed between the retainer and the spring for adjusting a pre-load spring force on the valve member.

11. The valve of claim 1, further including at least one filter in the passageway at least one of the inlet and the outlet.

12. The valve of claim 1, wherein the housing includes a tubular body, an inlet end piece defining the inlet and an outlet end piece defining the outlet.

13. The valve of claim 12, further including fasteners mounted to flanges of the end pieces for clamping the housing together.

14. A bi-stable valve in the fuel system of a turbine engine for relieving pressure between lower and upper pressure limits, the valve comprising a fuel driven poppet that toggles between one of two closed positions to interrupt flow from an inlet to an outlet, the poppet being in a first of the closed positions at least until the lower pressure limit is reached at the inlet and being in second of the closed positions after the upper pressure limit is reached, the poppet being movable to an intermediate position between the first and second closed positions when the inlet pressure is between the lower and upper limits to permit flow from the inlet to the outlet, wherein the poppet is a radially oriented disk with a contoured outer periphery disposed within an opening defined by a narrowed neck of a housing, wherein at least a portion of the outer periphery of the disk is disposed radially within the narrowed neck in both the first and second closed positions.

15. The valve of claim 14, wherein the poppet is moveable toward the second closed position by a force of fuel acting against a biasing member and wherein the poppet is moveable toward the first closed position under a spring force of the biasing member.

16. The valve of claim 15, further including a pair of seals disposed at opposite sides of the poppet being seated against by the sides of the poppet when in the first and second closed positions.

17. The valve of claim 14, wherein the poppet has an elongated stem with an enlarged section that contacts a body within the valve to limit non-axial movement of the poppet.

18. The valve of claim 17, wherein the stem is disposed with in a passageway between the inlet and the outlet and wherein the enlarged section of the stem has an axial opening therethrough in communication with the passageway and the outlet.

* * * * *